United States Patent
Maret

(10) Patent No.: US 9,682,601 B1
(45) Date of Patent: Jun. 20, 2017

(54) HOLD DOWN SYSTEM

(71) Applicant: Kevin Maret, Lincoln, NE (US)

(72) Inventor: Kevin Maret, Lincoln, NE (US)

( * ) Notice: Subject to any disclaimer, the term of this patent is extended or adjusted under 35 U.S.C. 154(b) by 0 days.

(21) Appl. No.: 15/043,945

(22) Filed: Feb. 15, 2016

Related U.S. Application Data

(60) Provisional application No. 62/116,062, filed on Feb. 13, 2015.

(51) Int. Cl.
*B60R 21/00* (2006.01)
*B60G 17/005* (2006.01)
*B62K 25/04* (2006.01)

(52) U.S. Cl.
CPC ............ *B60G 17/005* (2013.01); *B62K 25/04* (2013.01); *B60G 2204/4604* (2013.01); *B62K 2025/047* (2013.01)

(58) Field of Classification Search
CPC .............. B60G 7/04; B60G 2204/4604; B60G 2300/124; B60G 2300/27; B60G 2204/47; Y10T 403/16
USPC .................................. 280/754, 755, 124.106
See application file for complete search history.

(56) References Cited

U.S. PATENT DOCUMENTS

| | | | | |
|---|---|---|---|---|
| 4,552,238 A * | 11/1985 | Joyce, Jr. | ................ | B62D 12/00 172/783 |
| 6,126,178 A * | 10/2000 | Chino | ................... | B60G 13/005 280/6.154 |
| 6,257,597 B1 * | 7/2001 | Galazin | ................... | B60G 9/003 280/124.116 |
| 7,111,850 B2 * | 9/2006 | Pinto | ........................ | B60G 7/02 280/6.154 |
| 8,388,022 B2 * | 3/2013 | Kusiak | ..................... | B60G 7/04 280/754 |
| 2002/0149164 A1 * | 10/2002 | Pierce | .................... | B60G 9/003 280/86.5 |
| 2003/0176119 A1 * | 9/2003 | Royle | ....................... | B60F 3/00 440/12.54 |
| 2004/0112661 A1 * | 6/2004 | Royle | .................... | B60F 3/003 180/209 |
| 2006/0175785 A1 * | 8/2006 | Hamm | .................. | B60G 7/006 280/124.106 |

* cited by examiner

Primary Examiner — Toan To
(74) Attorney, Agent, or Firm — Advent, LLP

(57) ABSTRACT

A hold down system for a vehicle is described. The vehicle comprises a chassis biased by a suspension in a first direction away from a supporting surface. The hold down system comprises a base for attachment to a linkage arm of the suspension. The hold down system can further include a pin slidably coupled with the base, where the pin is extensible in a second direction away from the base. The pin can be biased in a third direction opposite the second direction and toward the base. The hold down system can also include a latching mechanism for attachment to the vehicle. The latching mechanism can be configured to latch the pin when the pin is extended in the second direction away from the base, and to release the pin in the third direction toward the base when the chassis is deflected in a fourth direction opposite the first direction.

15 Claims, 6 Drawing Sheets

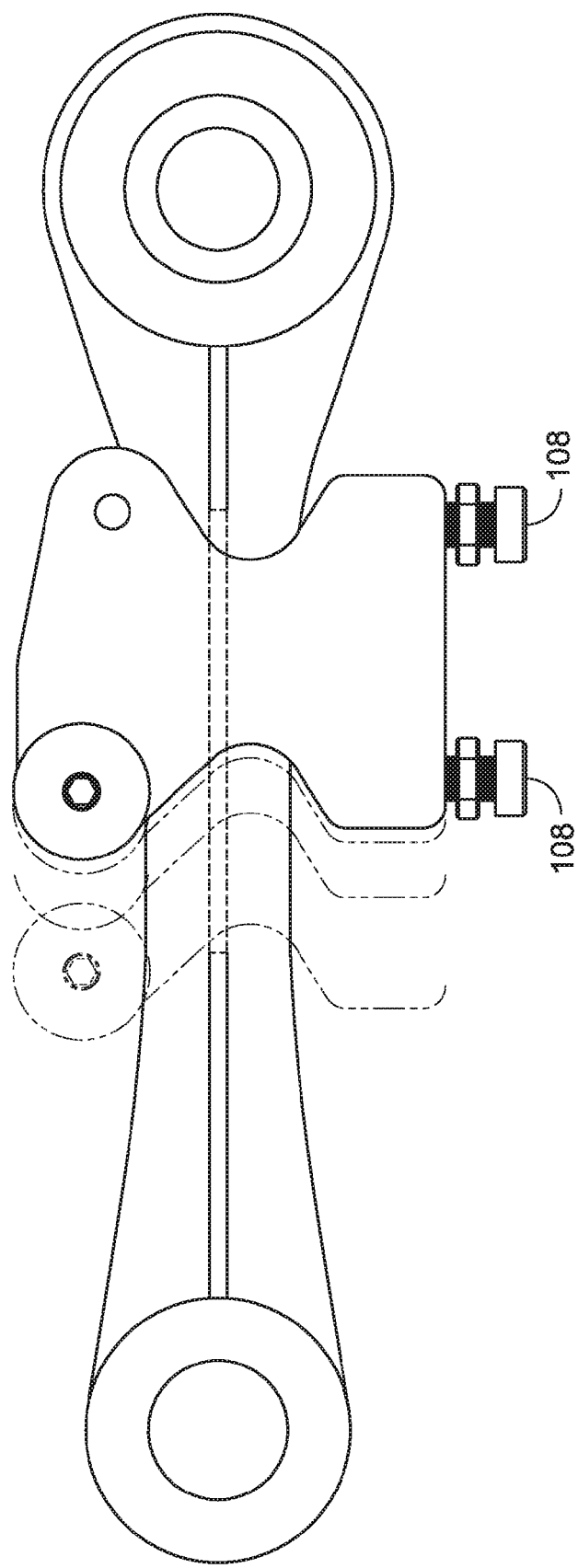

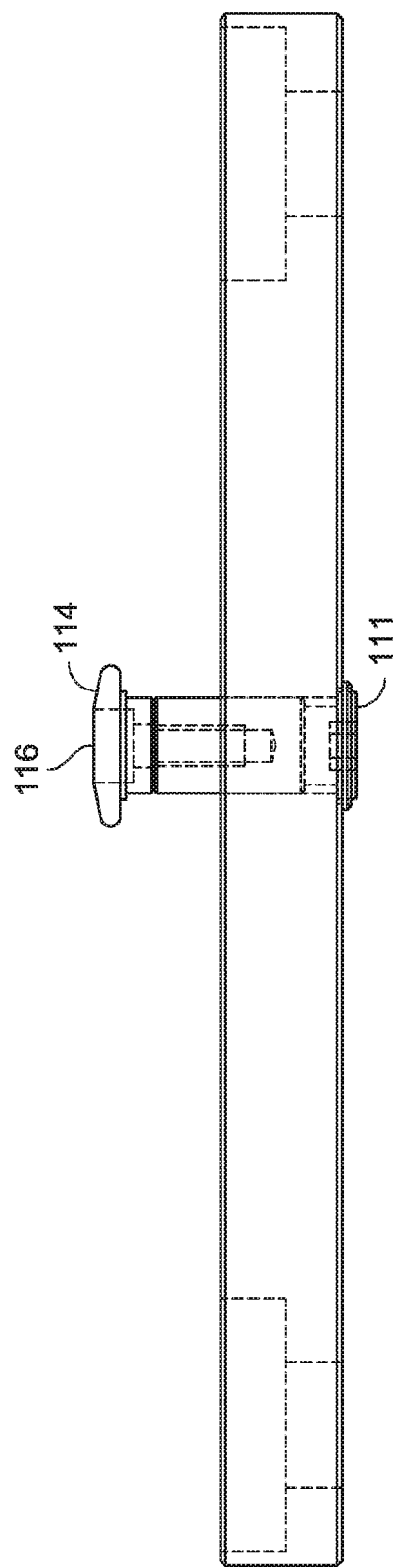
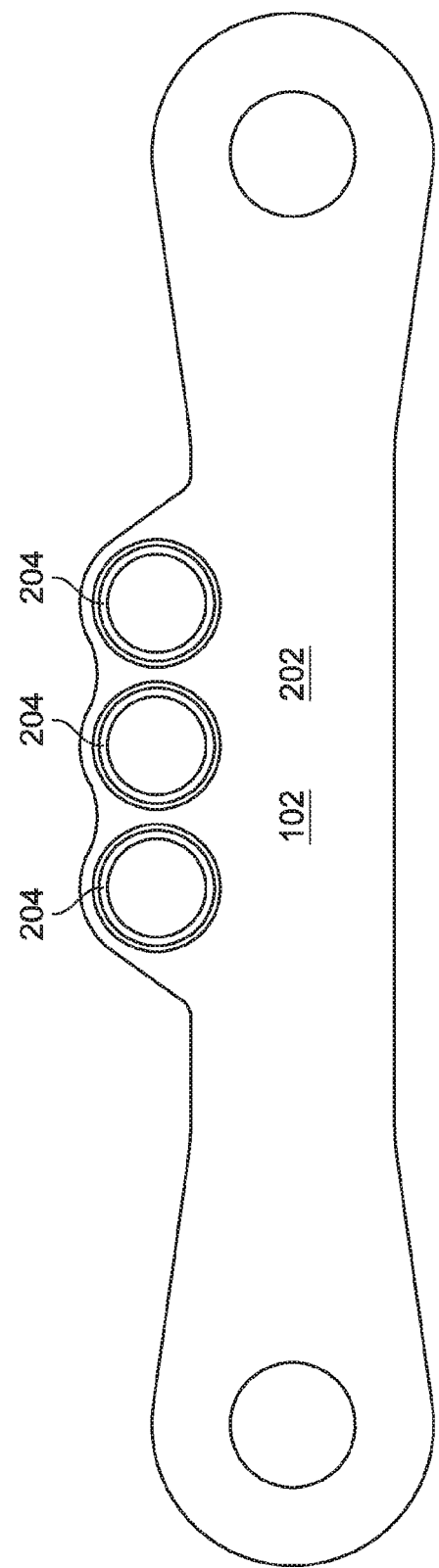

HOLD DOWN SYSTEM

SUMMARY

A hold down system for a vehicle, such as a motorcycle, is described. The vehicle comprises a chassis biased by a suspension in a first direction away from a supporting surface. The hold down system comprises a base for attachment to a linkage arm of the suspension. The hold down system can further include a pin slidably coupled with the base, where the pin is extensible in a second direction away from the base. The pin can be biased in a third direction opposite the second direction and toward the base. The hold down system can also include a latching mechanism for attachment to the vehicle. The latching mechanism can be configured to latch the pin when the pin is extended in the second direction away from the base, and to release the pin in the third direction toward the base when the chassis is deflected in a fourth direction opposite the first direction.

DRAWINGS

The detailed description is described with reference to the accompanying figures. The use of the same reference numbers in different instances in the description and the figures may indicate similar or identical items.

FIG. 3 is a diagrammatic partial side view illustrating a hold down system in accordance with an example implementation of the present disclosure, where the hold down system is movable along a linkage arm.

FIG. 4 is a diagrammatic bottom view illustrating a hold down system in accordance with another example implementation of the present disclosure.

FIG. 5 is a diagrammatic side view illustrating a hold down system in accordance with another example implementation of the present disclosure as shown in FIG. 4.

DETAILED DESCRIPTION

Figure 1:
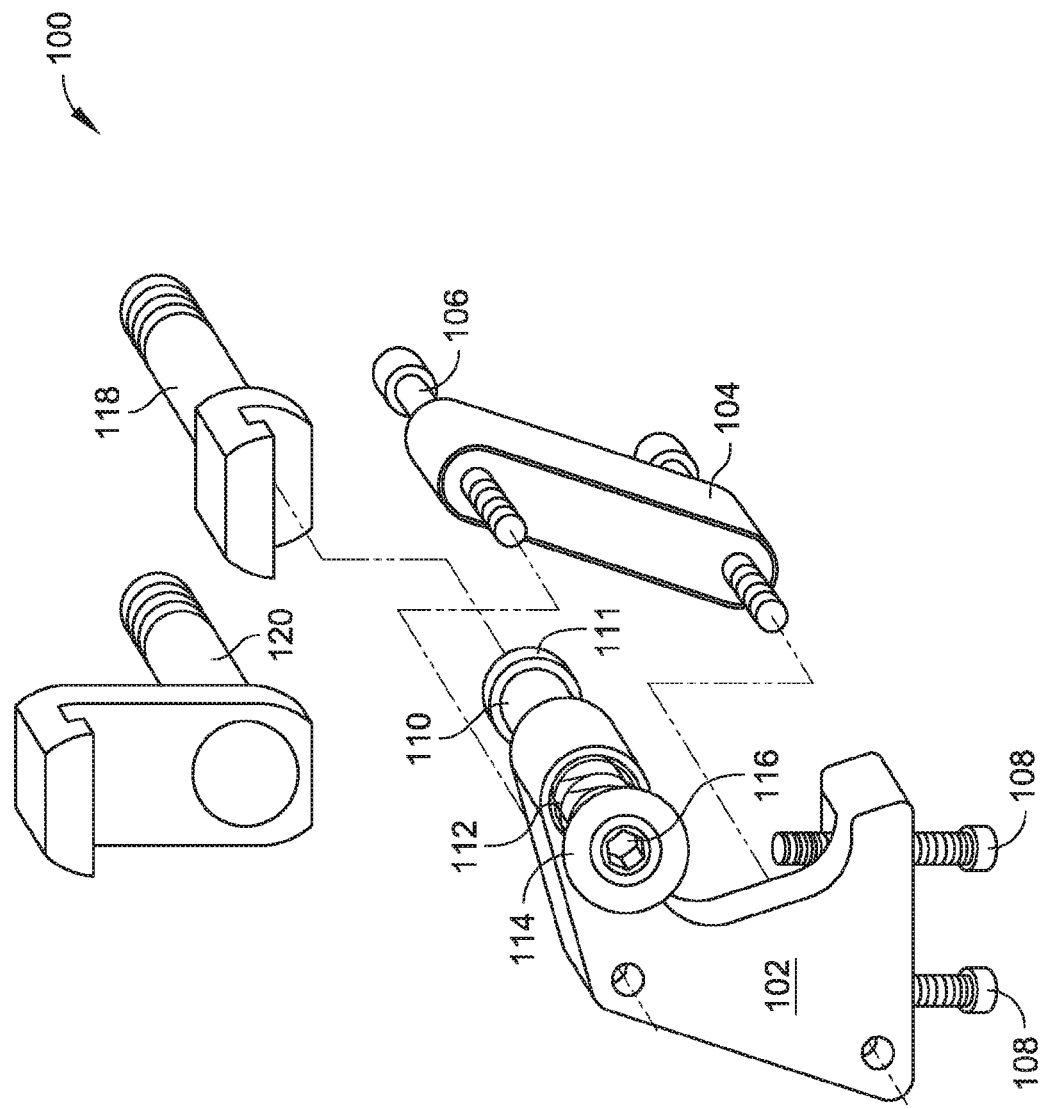
FIG. 1 is a diagrammatic partial exploded view illustrating a hold down system in accordance with an example implementation of the present disclosure.

A hold down system 100 for a vehicle or a subframe of a vehicle is described. In embodiments of the disclosure, the vehicle includes a chassis biased by a suspension in a first direction (e.g., upwardly) away from a supporting surface, such as the ground. For example, the vehicle comprises a motorcycle, and the suspension comprises a rear suspension of the motorcycle. The hold down system comprises a base for attachment to a linkage arm of the suspension (e.g., a rear suspension linkage arm). In some embodiments, the base can be set in position with respect to the linkage arm by one or more set screws (or other suitable fasteners). The hold down system can also include a backer plate for securing the base to the linkage arm. In other embodiments, the vehicle may include a subframe mount or a rear brake reservoir mount. In these embodiments, the hold down system may comprise a base for attaching to the subframe mount or a rear brake reservoir mount.

The hold down system can further include a pin slidably coupled with the base, where the pin is extensible in a second direction away from the base (e.g., toward the chassis). The pin can be biased (e.g., biased by a spring, biased by a magnet, biased by elastomer springs, biased by polymer springs, biased by urethane springs, biased by a rigid sponge that can provide resistance for rebound, biased by torsional rubber [e.g., a torsional trailer axle], biased by spring steel etc.) in a third direction opposite the second direction and toward the base (e.g., away from the chassis). For example, the second direction and the third direction are generally perpendicular to the first direction. The hold down system can also include a latching mechanism for attachment to the vehicle. The latching mechanism can be configured to latch the pin when the pin is extended in the second direction away from the base, and to release the pin in the third direction toward the base when the chassis is deflected in a fourth direction opposite the first direction (e.g., downwardly toward the ground). In some embodiments the pin comprises a flange and the latching mechanism comprises a hook configured to capture the flange. In other embodiments, the latching mechanism may comprise a keyway hook and latch, a round pin, a square pin, a push bar with hook, or the like.

Thus, the present disclosure is directed to a device designed to compress the rear suspension and/or remove the rear shock sag from the rear suspension of a motorcycle, effectively making the rear of the motorcycle rigid during the start procedure of a race.

For example, motorcycles, such as off-road or dirt bikes, utilize suspension. However, suspension can dissipate power and traction. By effectively making the suspension solid, on both front and the rear, maximum traction can be provided during the start and then giving back the suspension to the bike after the start procedure. By making the suspension solid during the start procedure of an event, the motorcycle has reduced extra movements applied during full throttle acceleration and launches quickly out of the starting area of an event.

The present disclosure can be an add-on product that can be added to a motocross or off-road motorcycle in the marketplace. As described above, the hold down system attaches to any rear suspension linkage, whether it be the OEM linkage or an aftermarket linkage and is fully adjustable for fitment on said linkage. A user (or users) can push down on the seat at the rear of the motorcycle and while pushing down, the user or another person can reach under the swingarm and latch the hold down system to a latch system (e.g., a latching bolt, latch plate attached or added to the motorcycle). The system can prevent the bike or rear suspension from rebounding due to the latch and pin hooked into each other. When the motorcycle takes off out of the start, the rear wheel comes into contact with a backwards falling starting gate or a bump (or something similar) that causes the rear suspension to travel upward and when this happens, the pin is released from the hook system which can return the motorcycle's rear suspension.

As shown in FIG. 1, the system 100 is comprised of a base 102, a backer plate 104, a backer plate assembly bolt 106, one or more fasteners (e.g., base set screws) 108, a pin 110, a biasing member 112, a button 114, a button bolt 116, a latching mechanism 118, and/or an alternate latching mechanism 120. In some embodiments, the biasing member 112 comprises a spring, a magnet, elastomer springs, polymer springs, urethane springs, a rigid sponge that can provide resistance for rebound, torsional rubber [e.g., a torsional trailer axle], spring steel, or the like. In one or more embodiments, the latching mechanism 118 and/or the alternate latching mechanism 120 may comprise a keyway hook and latch, a round pin, a square pin, a push bar with hook, or the like.

Figure 2:
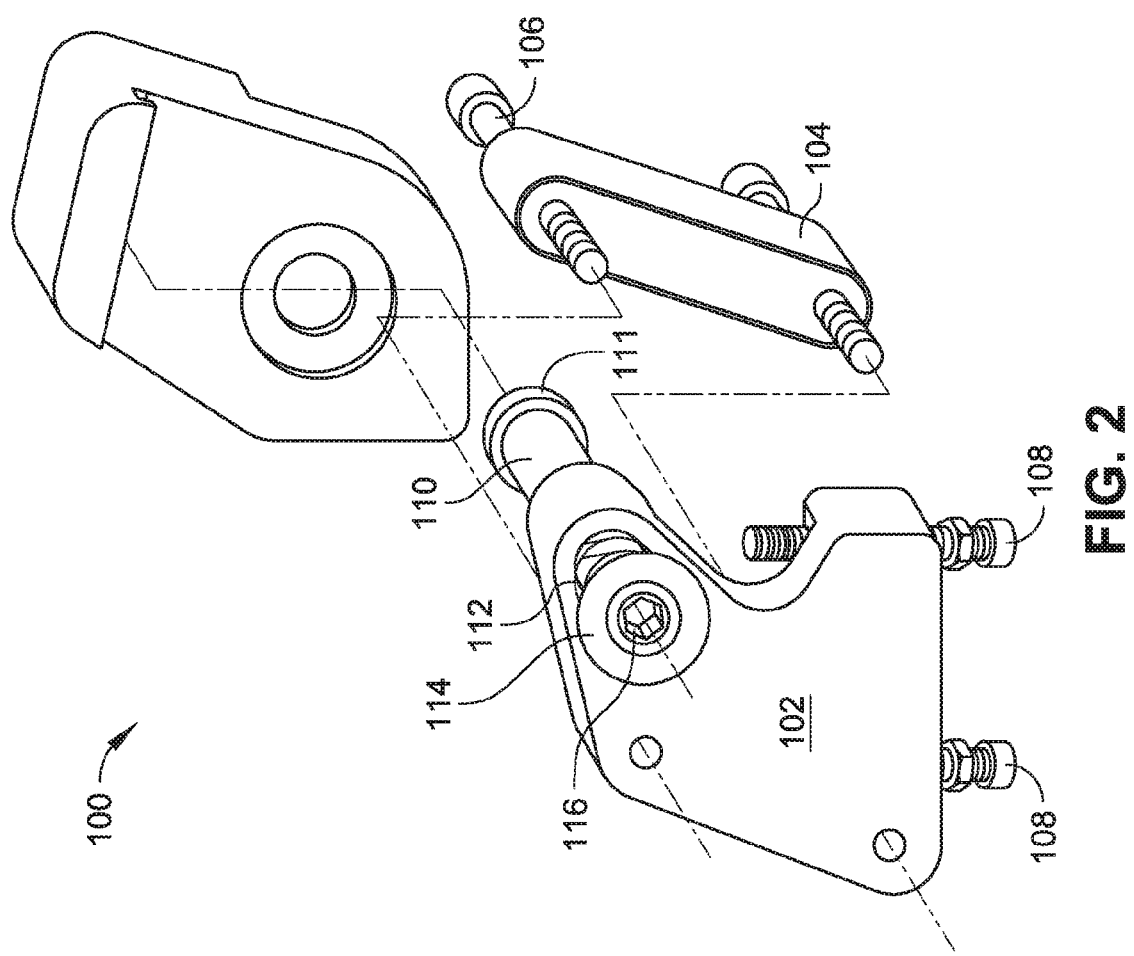
FIG. 2 is a diagrammatic partial exploded view illustrating a hold down system in accordance with an example implementation of the present disclosure.

For instance, as shown in FIGS. 1 through 3, the hold down system 100 may comprise a pin 110 coupled to a biasing member 112, such as a spring, and a button bolt 116. The base 102 is configured to retain the pin 110, the biasing member 112, and the button bolt 116. The base 102 can by adjusted such that the pin 110 corresponds to a latching mechanism 118 and/or the alternate latching mechanism 120 disposed on the vehicle. A user can actuate the biasing member 112 such that the pin 110 (e.g., a lip 111 of the pin 110, a flange 111 of the pin 110, a flared end 111 of the pin 110, etc.) engages with the latching mechanism 118 and/or the alternate latching mechanism 120.

In one or more embodiments of the present disclosure, the system 100 may comprise an adjustable system as shown in FIGS. 4 and 5. For instance, the base 102 may comprise a linkage arm 202 configured to receive a button 114 (e.g., button bolt 116) that comprises the biasing member 112 and a pin 110. The linkage arm 202 may define a plurality of holes 204 allowing a user to maintain a different setting utilizing the respective hole 204. For example, the user may adjust the system 100 by positioning the button 114 (e.g., button bolt 116) that comprises the biasing member 112 and a pin 110 in the designated hole 204 that corresponds with the latching mechanism 118 and/or alternate latching mechanism 120.

Figure 6:
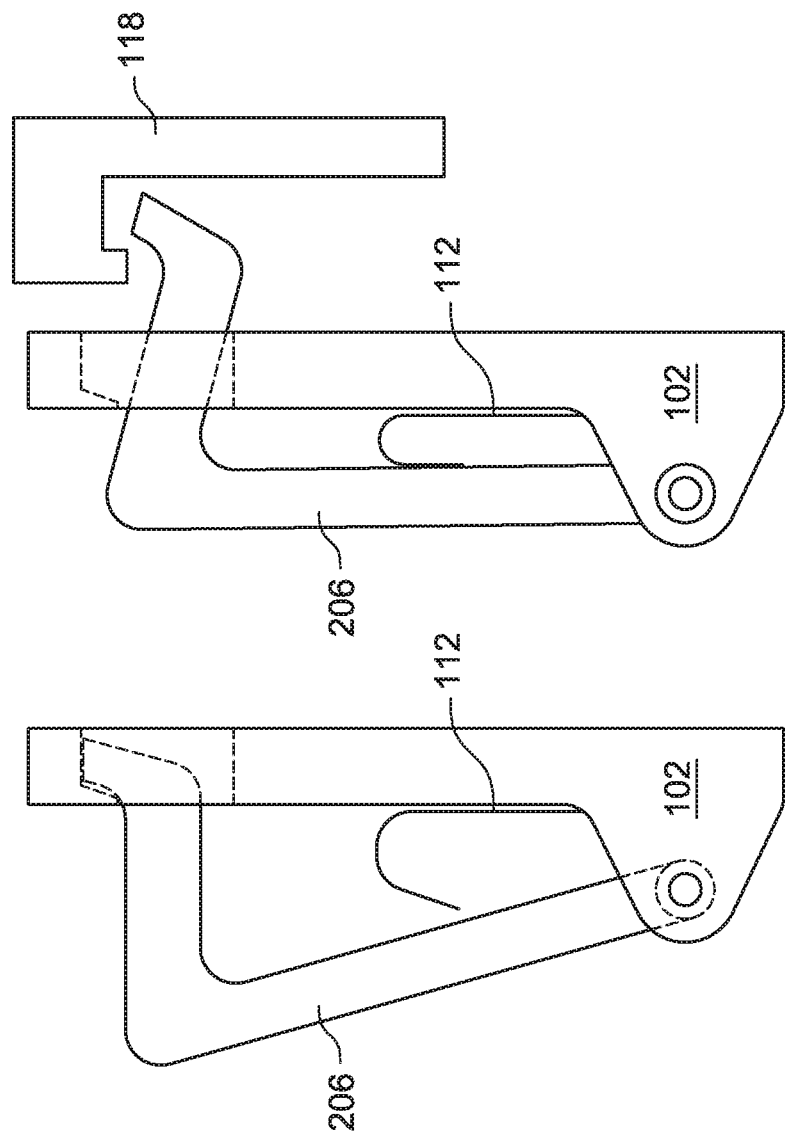
FIG. 6 is a diagrammatic side view illustrating a hold down system in accordance with another example implementation of the present disclosure.
Figure 7:
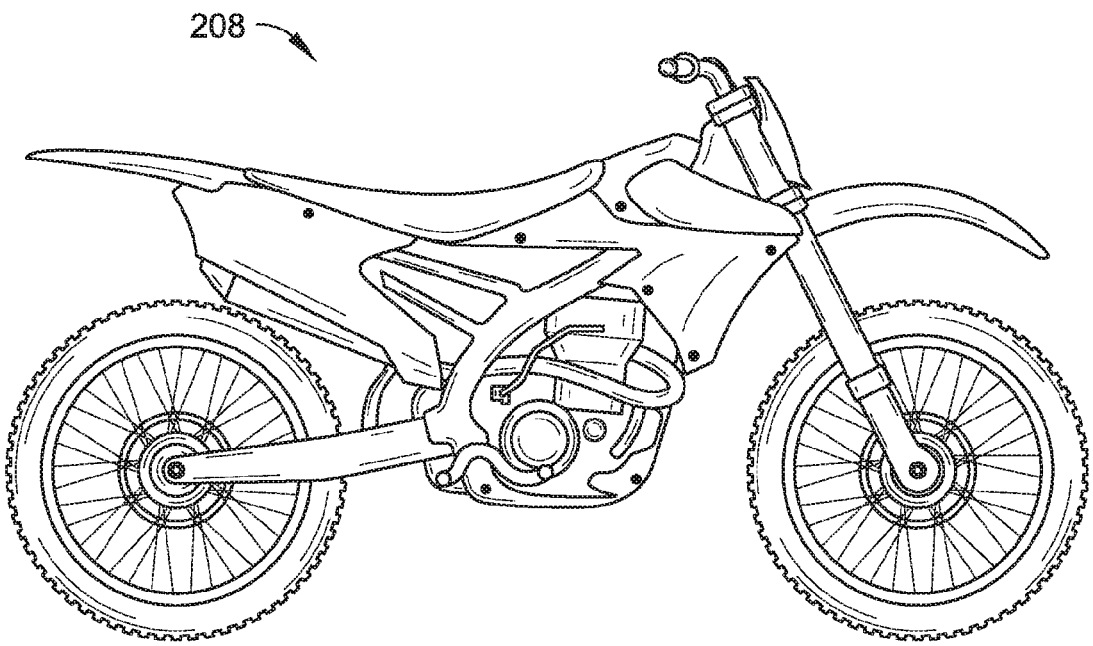
FIG. 7 illustrates an example vehicle utilizing a hold down system in accordance with another example implementation of the present disclosure to compress the rear suspension of the vehicle.
Figure 8:
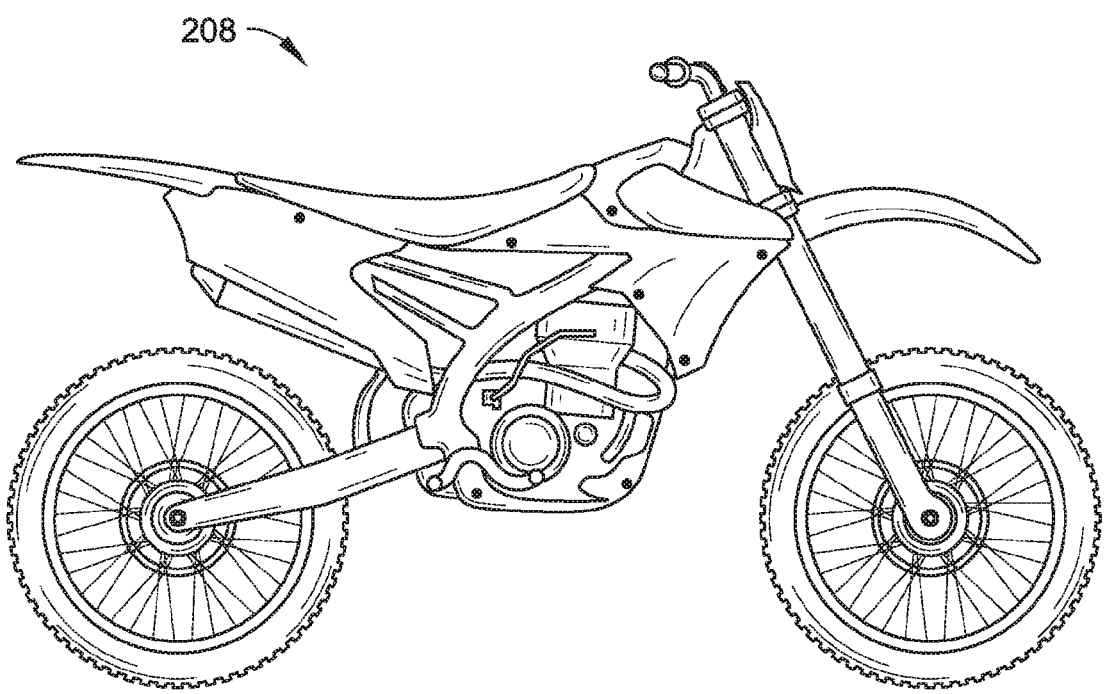
FIG. 8 illustrates an example vehicle having an uncompressed rear suspension.

In one or more embodiments, as shown in FIG. 6, the hold down system 100 may comprise the base 102 having a latch 206 pivotally coupled thereto. The latch 206 is configured to be biased by a biasing member 112 (e.g., a spring steel). The latch 206 is configured to be actuated by a user such that the latch 206 engages with a corresponding latching mechanism 118 coupled to the vehicle (e.g., a motorcycle 208 shown in FIGS. 7 and 8). The biasing member 112 biases the latch 206 such that when the latch 206 disengages from the latching mechanism 118, the biasing member 112 biases the latch 206 in a direction generally opposite from the latching mechanism 118.

The base 102 is mounted to the OEM (stock) or aftermarket rear suspension linkage arm and secured to linkage arm by one or more fasteners 108. Once the position of the base 102 is set, the backer plate 104 and backer plate assembly bolts 106 are attached to additionally secure the hold down system 100 to the linkage arm. The latching mechanism 118 and/or alternate latching mechanism 120 are used to adjust amount of hold down system as desired or needed. In some embodiments, by moving the base 102 further forward or further back on the linkage arm may allow for adjustment of the amount of hold down desired between about one hundred millimeters (100 mm) to about one hundred and forty-nine millimeters (149 mm) of rear suspension compression.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

The invention claimed is:

1. A hold down system for a vehicle with a chassis biased by a suspension in a first direction away from a supporting surface, the hold down system comprising:
   a base for attachment to a linkage arm of the suspension;
   a pin slidably coupled with the base, the pin extensible in a second direction away from the base, the pin biased in a third direction opposite the second direction and toward the base, the second direction and the third direction generally perpendicular to the first direction; and
   a latching mechanism for attachment to the vehicle, the latching mechanism configured to latch the pin when the pin is extended in the second direction away from the base, the latching mechanism configured to release the pin in the third direction toward the base when the chassis is deflected in a fourth direction opposite the first direction.

2. The hold down system as recited in claim 1, wherein the vehicle comprises a motorcycle, and the suspension comprises a rear suspension of the motorcycle.

3. The hold down system as recited in claim 2, wherein the linkage arm comprises a rear suspension linkage arm.

4. The hold down system as recited in claim 1, further comprising a set screw for setting a position of the base with respect to the linkage arm.

5. The hold down system as recited in claim 1, further comprising a backer plate for securing the base to the linkage arm.

6. The hold down system as recited in claim 1, wherein the pin comprises a flange and the latching mechanism comprises a hook configured to capture the flange.

7. A hold down system for a vehicle with a chassis biased by a suspension in a first direction away from a supporting surface, the hold down system comprising:
   a base for attachment to the suspension;
   a pin slidably coupled with the base, the pin extensible in a second direction away from the base, the pin biased in a third direction opposite the second direction and toward the base, the second direction and the third direction generally perpendicular to the first direction; and
   a latching mechanism for attachment to the vehicle, the latching mechanism configured to latch the pin when the pin is extended in the second direction away from the base, the latching mechanism configured to release the pin in the third direction toward the base when the chassis is deflected in a fourth direction opposite the first direction.

8. The hold down system as recited in claim 7, wherein the vehicle comprises a motorcycle, and the suspension comprises a rear suspension of the motorcycle.

9. The hold down system as recited in claim 7, further comprising a set screw for setting a position of the base with respect to the base.

10. The hold down system as recited in claim 7, wherein the pin comprises a flange and the latching mechanism comprises a hook configured to capture the flange.

11. The hold down system as recited in claim 7, wherein the base comprises a linkage arm.

12. A hold down system for a vehicle with a chassis biased by a suspension in a first direction away from a supporting surface, the hold down system comprising:
   a base for attachment to the suspension;
   a latch pivotally coupled to the base, the latch pivotable in a second direction away from the base, the latch biased in a third direction opposite the second direction and toward the base, the second direction and the third direction generally perpendicular to the first direction; and a latching mechanism for attachment to the vehicle, the latching mechanism configured to latch the latch when the latch is extended in the second direction, the latching mechanism configured to release the latch in the third direction toward the base when the chassis is deflected in a fourth direction opposite the first direction.

13. The hold down system as recited in claim 12, wherein the vehicle comprises a motorcycle, and the suspension comprises a rear suspension of the motorcycle.

14. The hold down system as recited in claim 12, further comprising a set screw for setting a position of the base.

15. The hold down system as recited in claim 12, further comprising a backer plate for securing the base.

* * * * *